United States Patent Office 3,101,012
Patented Aug. 20, 1963

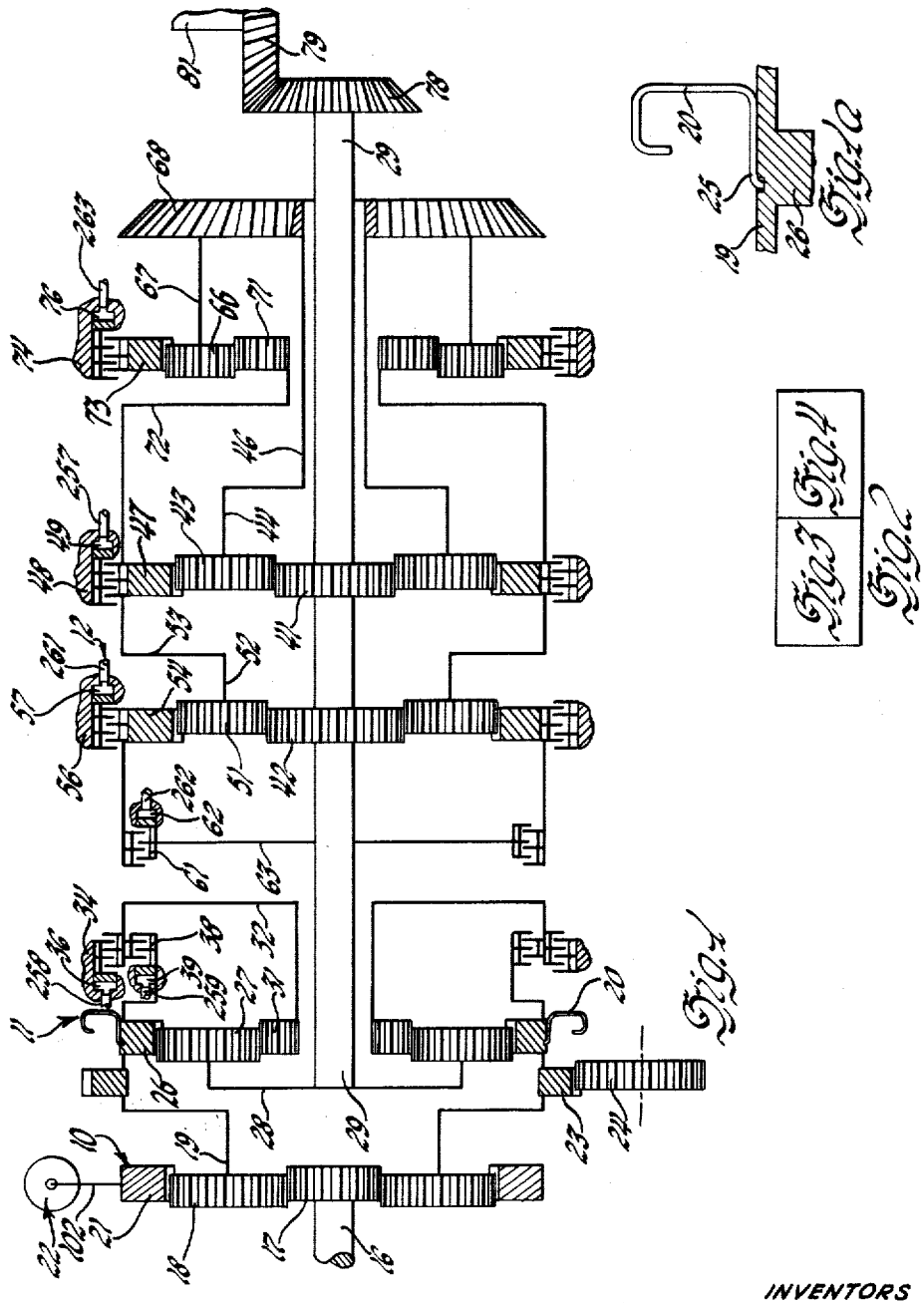

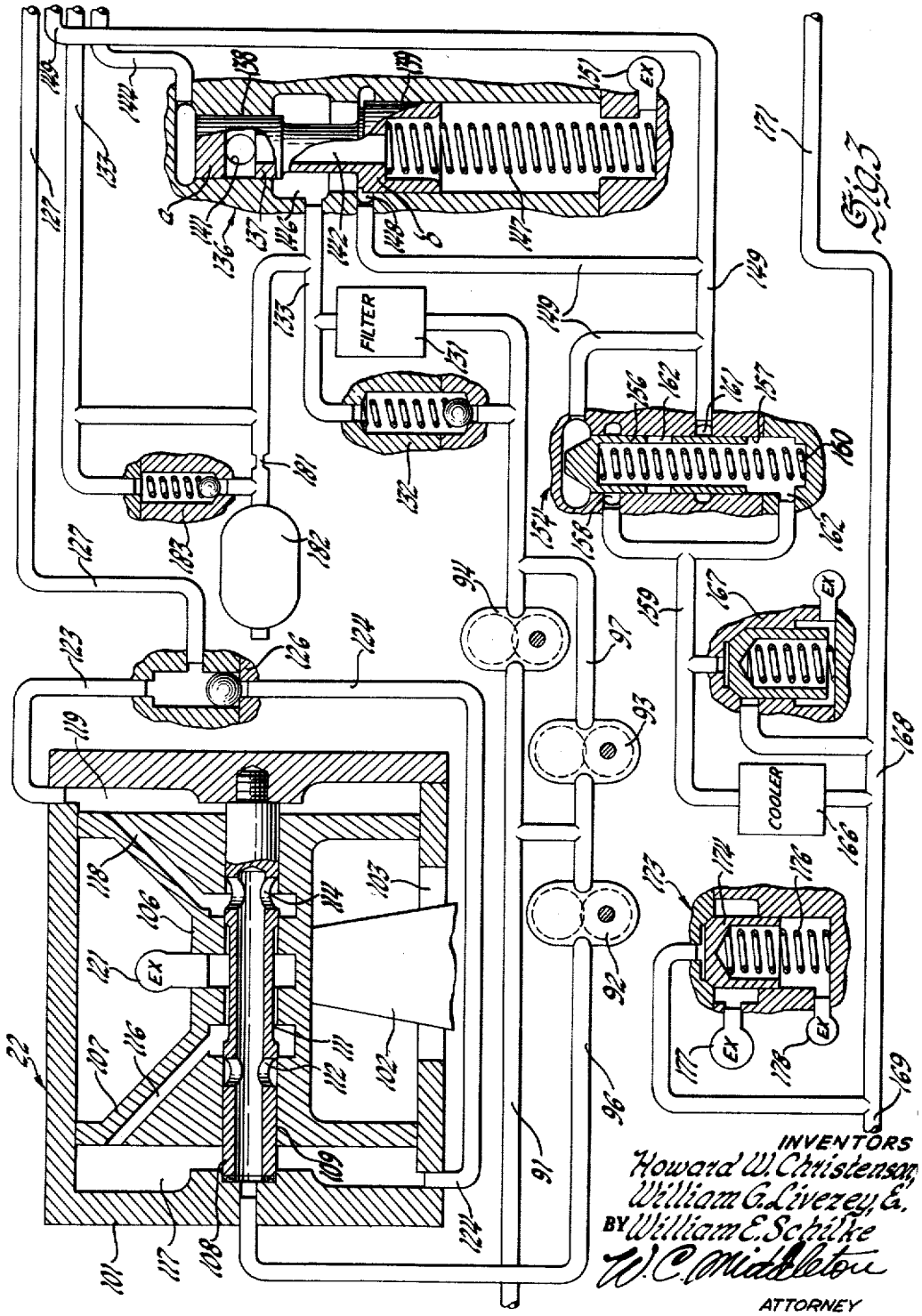

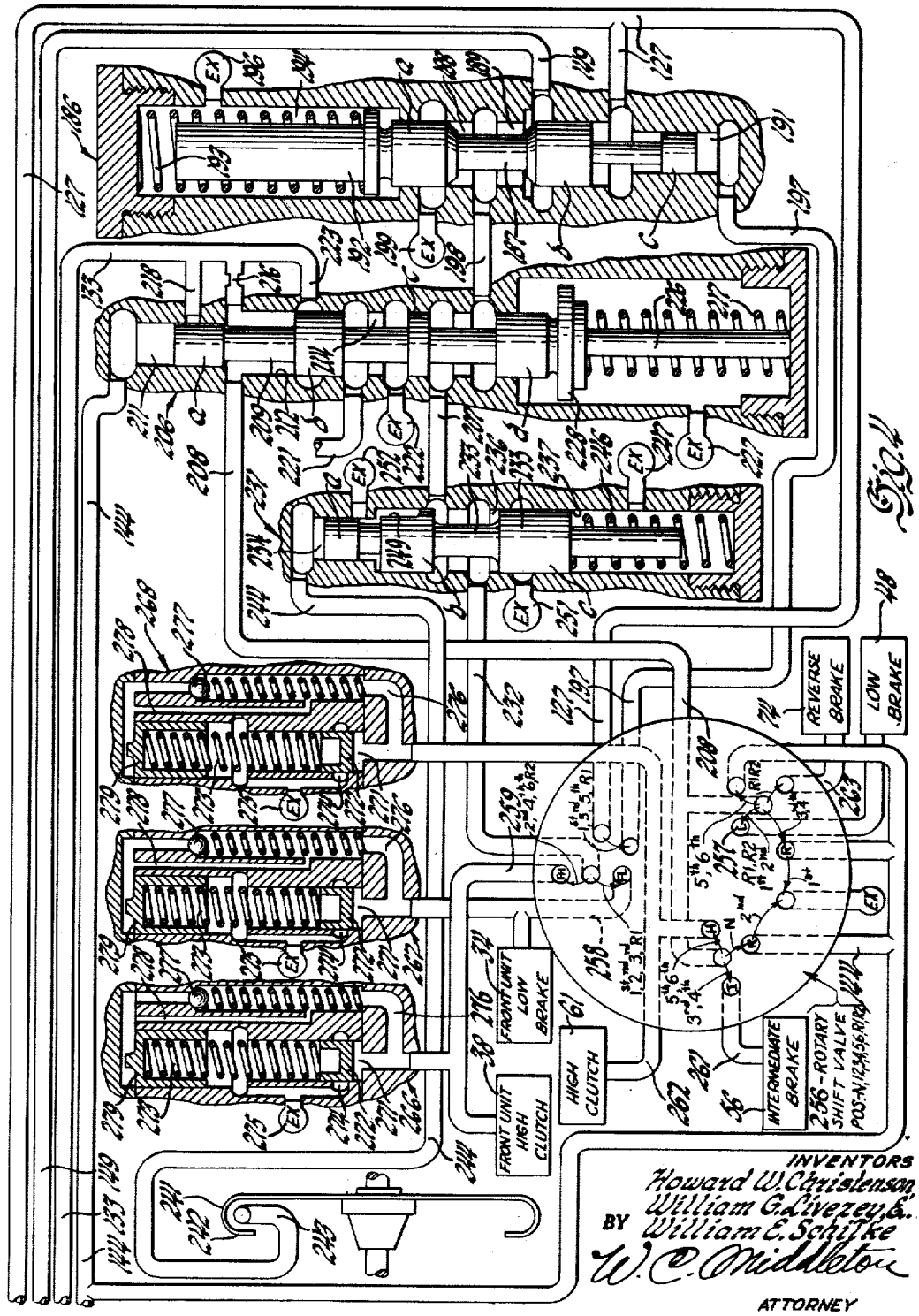

3,101,012
TRANSMISSION
Howard W. Christenson and William G. Livezey, Indianapolis, and William E. Schilke, Brownsburg, Ind., assignors to General Motors Corporation, Detroit, Mich., a corporation of Delaware
Filed May 27, 1957, Ser. No. 661,781
20 Claims. (Cl. 74—752)

This invention relates to a transmission and a hydraulic control system.

The transmission is particularly adapted for use with turbine drives and provides six forward speeds and two reverse ratios. The planetary gearing consists of a front unit providing two speeds and a rear unit providing three speeds and reverse which are combined to provide for six forward ratios and two reverse ratios. The control system employs a manual selector valve which will supply fluid to a ratio device such as a clutch or brake in each unit to provide these ratios. However, due to the heavy inertia torques that are encountered in gas turbine engines due to the high rotational inertia of turbines it was found necessary to limit the loads on the transmission and drive gearing to avert failures. In the present transmission arrangement it was found necessary to limit stresses or loads on the rear gear unit particularly during shifts from one range to another since the change in momentum involved in speeding up or slowing down the gas turbine tends to cause high peak torques when the change in momentum occurs too rapidly. The control system is arranged to disengage the ratio devices of the front unit during each shift interval, to re-engage the ratio device of the front unit after the ratio device of the rear unit is fully engaged, and to limit the rate of engagement of the ratio device of the front unit so that the torque transmitted through the transmission is limited to a predetermined value. The front unit ratio devices are disconnected during each rear unit ratio change by a cut-off valve in the line supplying fluid to the front unit ratio devices which is actuated by flow through the ratio supply line to the rear unit ratio devices which disconnects the front unit supply whenever a rear unit ratio device is being supplied with fluid. In addition the pressure supply to the front unit ratio devices is controlled in proportion to the torque being transmitted through the transmission to limit the maximum torque transmitted to a predetermined value. When the output overruns the input, i.e., during down-hill coasting, it is desirable to limit the maximum speed of the turbine. This is done by disconnecting the front unit ratio devices by an overspeed cut-off valve which disconnects the supply to all the front unit clutches in response to engine overspeed indicated by the transmission governor.

An object of the invention is to provide in a multiratio transmission having two gear units connected in series, an automatic control system in which the ratio change devices of one unit are disengaged during the ratio change interval of the devices in the other unit of transmission and thereafter engaged.

Another object of the invention is to provide in a multiratio transmission requiring the engagement of a group of ratio change devices to engage each ratio, a control system to limit the torque transmitted by the transmission by controlling a selected ratio change device in each group.

Another object of the invention is to provide a transmission having a front gear unit and a rear gear unit connected in series to provide a plurality of ratios, a control system in which one unit is disengaged whenever a ratio change occurs in the other unit and torque responsive control for engaging the ratio devices to limit the maximum torque transmitted by the transmission.

Another object of the invention is to provide in a multiratio transmission a control to limit the speed of certain transmission components by disconnecting the transmission drive to certain transmission components.

These and other objects of the invention will be more apparent from the following complete description and drawings of the preferred embodiment of the invention.

FIGURE 1 is a diagrammatic showing of the transmission gearing.

FIGURE 1a is an enlarged section of a part of FIGURE 1 showing the pitot governor.

FIGURES 3 and 4, when arranged in accordance with the diagram in FIGURE 2, schematically show the hydraulic control system.

This transmission, particularly designed for use with high-speed engines such as gas turbine engines, has a two speed front unit and a three speed and reverse rear unit providing six forward drive ratios and two reverse drive ratios. The control system for the ratio change gearing will cause a front unit ratio clutch to slip or disengage to provide smooth shifts, to limit the torque to protect the transmission and the drive train against overloads and to limit the speed to prevent excessive engine speeds on output overrun, i.e., for vehicle transmissions under downhill overrun conditions.

The transmission assembly has serially connected a reduction gear unit 10, a front unit 11 providing two ratios, and a rear unit 12 providing three forward ratios and reverse. As will be explained in detail below the front gear unit and the rear are combined to provide six forward ratios and two reverse ratios. The output shaft from a gas turbine or other suitable high-speed engine is connected to the transmission input shaft 16 which drives the sun gear 17 of the planetary reduction unit 10. The sun gear meshes with planetary pinions 18 which are mounted on a carrier 19 or transmission input member. The input member 19 is driven at a slow speed since the ring gear 21 is substantially stationary. The torque meter device 22 holds the ring gear stationary and provides a pressure proportional to the torque being transmitted through the reduction gearing 10 and the transmission. The input member 19 has a power take-off gear 23 mounted thereon which drives suitable spur gear 24 which may provide the drive for various accessories such as the input driven pump and the input drive pitot governor.

The pitot governor can 20 may also be mounted directly on the input member 19. The can 20 has a generally annular shape and a cylindrical internal portion which press fits over the outer cylindrical surface of the input member 19 as shown in FIGURE 1 and has a flange 25 snapped or bent into the groove in member 19. The other portion of the can 20 extends substantially radially out from the input member and is reversely bent to provide an annular chamber opened at the inside for the fluid which is retained in the chamber by centrifugal force.

In the front planetary gear unit 11 the input member 19 drives the ring gear 26 which meshes with the planetary pinions 27 mounted on the output carrier 28 fixed to the output shaft 29. The sun gear of the front unit 11 is fixed to a control hub 32 which may be stopped to provide underdrive by a brake or ratio device 34 which includes a fluid motor 36 or which may be connected to the input member 19 to provide a direct drive when the clutch or ratio device 38 which includes fluid motor 39 is engaged. Thus the input member 19 will be connected to drive the intermediate output shaft 29 in direct drive when the clutch 38 is engaged and in underdrive when brake 34 is engaged.

The intermediate output shaft 29 drives the first input sun gear 41 and the second input sun gear 42 of the rear unit 12. The first sun gear 41 meshes with the planetary pinions 43 mounted on a carrier 44 connected to the output shaft 46. The pinions 43 also mesh with the ring gear 47 which may be stopped to provide first or low ratio by engaging the brake 48 which includes a fluid motor 49. The second sun gear 42 meshes with planetary pinions 51 which are mounted on a carrier 52 which is connected by the hub 53 to the ring gear 47. Pinions 51 also mesh with a ring gear 54 which may be stopped by the brake 56 which includes the fluid motor 57 to provide intermediate ratio. The ring gear 54 is also connected by a clutch 61 which includes the fluid motor 62 for actuating the clutch to connect the ring gear 54 through the hub 63 to the intermediate shaft 29 to provide direct drive or high in rear unit 12. The reverse gear set has a plurality of planetary pinions 66 mounted on a carrier 67 connected to the output gear 68 and shaft 46. The planetary pinions 66 mesh with a sun gear 71 which is connected by hub 72 to ring gear 47 and with a ring gear 73 which may be stopped to provide reverse by engaging brake 74 which includes a fluid motor 76. The above brakes 48, 56 and 74 and clutch 61 are ratio devices.

The output shaft 46 and gear 68 provide the final drive of this transmission. Where the transmission is used for an industrial drive or in a vehicle drive requiring a single input such as a conventional differential vehicle drive the drive gear 68 is the output member. Where it is desired to use this transmission in connection with a power steer crossdrive unit of the type shown in the applicant's co-pending application S.N. 484,122, filed January 26, 1955, now Patent No. 2,930,257, entitled, "Transmission," the intermediate output shaft 29 may be extended through the shaft 46 and connected by gears 78 and 79 to the auxiliary power shaft 81 which is employed to provide a power for steering the crossdrive transmission.

*Hydraulic Control System*

The hydraulic control system is supplied with fluid from the transmission sump by line 91 which supplies fluid to a first input driven pump 92 and second input driven pump 93 and output driven pump 94. The first input pump which may be driven by the accessory gear 23 supplies fluid under pressure through line 96 to supply the torque meter 22 with fluid under pressure while the second input driven pump which may also be driven by gear 23 supplies fluid under pressure to main line 97. The output driven pump which may be driven by the output shaft 46 or drive gear 68, supplies the main line 97 when the transmission is operating in a forward ratio.

The torque meter 22 has a cylinder 101 which is closed at both ends and mounted on the transmission housing so that it is stationary. The torque meter measure the reaction on the ring gear 21 which is proportional to the torque being transmitted by the transmission. The ring gear 21 has fixed thereon a radially extending arm 102 which extends through a slot 103 in cylinder 101 and may have a forked end connected in a conventional manner not shown, for example, by a pin and slot connection, to the central portion 106 of the double ended piston 107 to axially move the piston in the cylinder whenever the ring gear 21 moves. The cylinder 101 has an axial tube 108 fixed and sealed to the cylinder. The tube is connected to the torque meter supply line 96 and closed at the opposite end of tube 108 and fits within an axial bore 109 extending through piston 107 to provide a valve. The tube valve parts comprise, on the tube 108, a central groove 111 of portion of reduced external diameter and ports 112 and 114 spaced from opposite ends of the groove 111 and on the piston 107 supply ports and passages 116 and 118 extending from bore 109 to cylinder end 117 and 119 respectively and exhaust 121 at the center of bore 109. With the piston 107 in the central position, the port 112 is connected to a passage 116 communicating with one end 117 of the cylinder while the port 114 is connected by a passage 118 with the other end 119 of the cylinder 101 and these passages 116 and 118 are also connected by the groove 111 to exhaust 121 and slot 103 through which fluid is returned to the transmission sump.

When the forward torque reaction force on the gear 21 moves the arm 102, for example, to the right as shown in FIGURE 3, the piston 107 is moved to the right closing port 112 and the connection between the passage 118 and groove 111 to exhaust 121 so that supply line 96 is connected through the tube 108, port 114, and passage 118 to the end 119 of the cylinder 101. This pressure will be proportionate to the torque reaction on the gear 21 since an excess pressure in the cylinder end 119 will move the piston back to open exhaust 121. Thus a pressure proportionate to the torque reaction gear 21 is supplied to line 123. The other cylinder end 117 is simultaneously connected by passage 116 and groove 111 to exhaust 121 so no pressure is supplied to line 124. Movement of the arm 102 in the opposite direction by reverse torque reaction on gear 21 similarly provides pressure in cylinder end 117 proportionate to the torque reaction which is connected by line 124. Lines 123 and 124 are connected through a double acting check valve 126 to the torque signal line 127 which supplies pressure proportional to the torque transmitted through the transmission during both forward and reverse drive.

Supply line 97 is connected through a filter 131 or, when there is an excessive pressure drop in the filter, through the filter by-pass valve 132 to the main line 133 which supplies the rear unit clutches. The pressure in the main line 133 is controlled by a primary regulator valve 136 having a piston 137 with a small land *a* and a large land *b* located in a small bore 138 and a large bore 139 respectively. The valve element 137 has a port 141 in land *a* connected by passage 142 extending axially through the valve to the end face of the land *b*. The end of the small bore portion 138 is connected to the ratio signal line 144 which provides a pressure in neutral, and third to sixth ratios acting on the end of the land *a* to decrease the pressure from the normal high pressure, i.e., 225 p.s.i. to a lower value, i.e., 110 p.s.i. The main line 133 is connected to a port 146 between the small bore 138 and large bore 139 so that the fluid pressure acts upon the unbalanced area between lands *a* and *b* to move the valve toward the exhaust position. A spring 147 engages the end of the bore 139 and the valve element 137 to bias the valve toward the closed position to regulate the normal high pressure. When the pressure in main line 133 reaches the regulated value and acts upon the unbalanced area the valve element 137 moves against spring 147 to exhaust the excess fluid, first by opening port 148 connected to the secondary main line 149, and second by connecting port 146 through port 141, passage 142, and the spring chamber portion of bore 139 to exhaust 151.

The pressure in the secondary main line 149 supplies the front unit clutches and is regulated by the secondary regulating valve 154 at a pressure (i.e., 100 p.s.i.) less than the lower value pressure regulated by the primary regulator valve 136. The valve 154 has a valve element 156 located in the bore 157. The secondary line 149 is connected to one end of the bore 157 and acts on the end of the valve element 156 to urge the valve to the other end of the bore 157 against the spring 160 which is located between the valve element and the other end of the bore. Excessive pressure in line 149 will move the valve element 156 to open port 158 to the cooler line 159. If port 158 does not provide sufficient capacity to reduce the pressure in line 159 to the regulated value the line 149 will also be connected at port 161 through port 162 in valve element 156 and bore 157 to port 162 which is also connected to the cooler line 159.

Cooler line 159 is connected through the cooler 166 or through the cooler by-pass valve 167 in the event the pressure differential across the cooler is excessive, to the low-pressure supply line 168 which is employed to supply fluid at a low pressure, i.e., 30 p.s.i., to the transmission lubricating system 169 and the pitot governor feed line 171 which supplies fluid to the pitot governor chamber 242. The pressure in the low-pressure supply line 168 is regulated by the regulating valve 173 which has a valve element 173 which is moved against the spring 176 to exhaust excess fluid at 177. The spring chamber is exhausted at 178.

The primary main line 133 is connected through an orifice 181 to an accumulator 182. The accumulator in order to provide high volume supply to the main line is connected to the main line 133 through a one-way check valve 183 by passing orifice 181.

The torque limiting valve 186 has a valve element 187 having lands $a$ and $b$ of equal diameter located in a large diameter portion 188 of bore 189 and a small diameter land $c$ located in a small diameter bore portion 191. The valve element 187 has a stem 192 extending from land $a$ which limits the movement of the valve and provides a guide for the spring 193 located in the spring chamber portion 194 of bore 189. The spring chamber is provided with an exhaust 196 to avert fluid being trapped and interfering with the operation of the valve. The torque signal line 127 is connected in all of ratios to the bore between large and small portions to act on the unbalanced lands $b$ and $c$ to move the valve against the spring. The ratio controlled torque signal line 197 is connected by manual valve 256 to supply fluid from the torque signal line 127 whenever the front unit is in low and thus the transmission is in either first, third, or fifth forward ratios or the first reverse ratio. This ratio control torque signal line 197 is connected to the end of the small bore 191 and acts on the land $c$ together with torque signal pressure line 127 acting on the unbalanced area between the lands $b$ and $c$ to oppose spring 193 to further reduce the pressure. The secondary main line 149 is normally connected between the lands $a$ and $b$ of the valve element 187 to the torque controlled main line 198.

When the torque exceeds a predetermined value, i.e., 4000 foot pounds in intermediate shaft 29, the torque signal pressure will close the valve and land $b$ will close the port of the main line 149 and open line 198 to exhaust 199. If the clutch motors are filled the cut-off will be abrupt. However, if they are being filled, due to the flow to the motors and the bevel on lands $a$ and $b$, the flow and pressure will be gradually reduced to slip or disconnect a front unit clutch to limit the torque transmitted. When the torque is reduced the torque signal pressure is reduced and land $a$ will close the exhaust 199 and reconnect main line 149 between the lands $a$ and $b$ to line 198 to supply the front unit clutches. The torque meter 22 provides a signal pressure proportional to input shaft 16 torque. Since the intermediate shaft 29 torque varies with respect to the input torque in accordance with the front unit gear ratio, the torque signal pressure acts on the unbalanced area of land $b$ when the front unit 11 is in high ratio and on this area and the area of land $c$ when the front unit is in low ratio to close valve 186 at a lower torque signal pressure since the torque in the intermediate shaft is greater than the measured input torque due to the gear ratio. Thus the torque in the intermediate shaft is limited to the same value in both front unit ratios.

The torque limiting valve 186 may be provided with hysteresis by a slight decrease in the size of land $a$ of valve element 187 and the portion of the bore in which it operates. Then the line pressure between the lands $a$ and $b$ would provide a force-resisting movement of the valve 187 to the closed position. Since this force would not be present to move the valve from the closed to the opened position, the torque would have to be reduced by a predetermined value before the valve would open. This arrangement would prevent hunting and provide a snap action valve which would either engage or disengage the front unit clutches.

The front unit cut-off valve 206 is employed to cut off the pressure supply from the secondary main line 149 and line 198 to the front unit supply line 207 which supplies the front unit clutches whenever the fluid is supplied from the primary main line 133 to the rear unit supply line 208. The cut-off valve 206 has a valve element 209 having a small land $a$ located in a small bore portion 211 located at the upper end of the bore 212 and lands $b$ and $c$ and $d$ of larger diameter located in large bore portion 214. The ratio signal line 144 supplies pressure when the transmission is in the third, fourth, fifth, or sixth ratios or when the intermediate clutch 56 or the high clutch 61 of the rear unit is engaged to the closed end of the small bore portion 211 to act on the end land $a$. When the transmission is operating in a ratio fluid is supplied from the main line 133 through the orifice 216 between the lands $a$ and $b$ to the rear unit supply line 208. The flow through the orifice will be sufficient to supply fluid to make up for any leakage without creating a pressure differential sufficient to actuate the valve. However, when a shift is made by moving the manual valve 256, requiring a change of ratio in the rear unit, flow from line 133 to line 208 across the orifice 216 reduces the pressure between the lands $a$ and $b$, permitting the spring 217, located at the other end of the valve, to raise the valve to the shift position. The valve 206 will upshift and downshift at points on the clutch pressure rise curve having the same proportion to the maximum pressure in line 133, since when the maximum pressure in line 133 is lowered by the action of ratio signal pressure in line 144 on regulator valve 136 the ratio signal pressure also acts on land $a$ of valve element 209 to modify the action of the valve element.

In the closed position land $a$ opens the unrestricted branch 218 of line 133 between the lands $a$ and $b$ to line 208 to provide an unrestricted supply of fluid to the ratio clutch being engaged. Valve 206 normally connects the throttle cut-off line 221 between the lands $b$ and $c$ to exhaust 222 but when a shift occurs in the rear unit and valve 206 is in the shift position throttle cut-off line 221 is connected to branch 223 of main line 133 to supply fluid to a throttle cut-off mechanism not shown to cut off or lower the throttle during the ratio change. This device is a fluid motor arranged to move the throttle to a lower setting or to reduce the speed setting of a speed governor or fuel feed control. The torque controlled main line 198, which is normally connected between the lands $c$ and $d$ to a cut-off main line 207, is blocked, when valve 206 is in the shift position, by land $d$ and line 207 is connected between the lands $c$ and $d$ to the exhaust 222 to disconnect splitter ratio devices 34 and 38 during each rear unit shift. The stem 226 which may be secured to the valve element 209 or to the end of the bore 212 provides a guide for spring 217 and limits the movement of the valve 209. The enlarged end portion of bore 212 in which the spring 217 is located has an exhaust 227 to prevent interference with the operation of the valve. The shoulder 228 limits upward movement of the valve.

The cut-off main line 207 is connected to the overspeed valve 231 which disconnects the supply of fluid to the front unit supply line 232 to cut off the supply of fluid to the front unit clutches and disengage the transmission drive to limit transmission speed to protect the transmission against excessive and dangerous speeds. The valve 231 has a valve element 233 having a small land $a$ in the small portion 234 of bore 236 and large lands $b$ and $c$ located in the large diameter bore portion 237. A pitot governor 241 having a cam 242 which may be as shown in FIGURE 1a or rotated by the power take-off gear 24 and supplied with fluid by the pitot feed line 171 has a pitot tube 243 which supplies fluid at a pressure proportional to transmission input speed to the governor line 244. The governor line 244 is connected to the end of small bore portion 234 so that the governor pressure acts on the end of land *a* of valve element 233 to urge the valve against spring 246 located in the opposite end of the large bore portion 237. The spring portion of bore 237 has an exhaust 247. When the transmission speed is below a predetermined value, considered safe, the valve 233 will be in the position shown connecting cut-off line 207 between the lands *b* and *c* to the front unit supply line 232. When the speed of the transmission is above the predetermined speed, governor pressure on land *a* will move the valve 233 against the spring 246 closing exhaust 252 connecting the line 207 to the axial groove 249 and the space between the lands *a* and *b* where the fluid will act on the unbalanced area of land *a* to provide hysteresis. The front unit supply line 232 will then be connected between lands *b* and *c* to exhaust 251 to disengage the front unit ratio clutches. The hysteresis action of the valve prevents reengagement of the front unit clutches until the speed drops a predetermined value.

The manual control valve 256 constructed in accordance with the teaching of FIGURES 7 and 8 of Patent 3,016,769 Christenson et al., filed May 18, 1955, is a rotary valve having nine positions providing six forward ratios, neutral and two reverse ratios. The valve 256 has a fixed plate shown and a rotatable plate made as taught in Patent 3,016,769 to provide the following connections. The manual valve 256 in the neutral position cuts off both the front unit supply line 232 and the rear unit supply line 208. In first ratio the rear unit supply 208 is connected to the low clutch line 257 to supply the low clutch 48 and the front unit supply line 232 is connected to the front unit low clutch line 258 and the clutch 34. In the second the rear unit supply line 208 remains connected to the low clutch line 257 and the front unit supply line 232 is connected to front unit high clutch line 259 and the clutch 38. In third ratio the rear unit supply line 208 is connected to the intermediate clutch line 261 and clutch 56 and the front unit supply line 232 is connected to the front unit low line 258. For fourth ratio the intermediate clutch clutch 56 remains engaged and the front unit supply line 232 is connected to the front unit high clutch 38 by line 259. In fifth and sixth ratio the rear unit supply line 208 is connected to the high clutch line 262 to engage the high clutch 61. The front unit supply line 232 is in fifth ratio connection to the low clutch line 258 and in sixth to the high clutch line 259. In reverse the rear unit supply line 208 is connected to the reverse clutch line 263 to provide in a R1 position a low reverse drive when the front unit supply line 232 is connected to the low line 258 and in the R2 position the high ratio reverse drive by connecting this line to clutch line 259. The manual valve 256 also connects in first, third and fifth forward ratios and the first reverse ratio the torque signal line 127 to the ratio torque signal line 197 to supply additional fluid to the torque limiting valve 186 whenever the front unit low clutch is engaged, since due to the nature of the gearing less pressure is required on the low clutch to transmit 4000 foot pounds of torque through the transmission than on the high clutch. This arrangement modifies front unit clutch pressure so that the same torque is transmitted when the front unit is either in high or low ratio. The rear unit supply line 208 is connected in neutral, third, fourth, fifth, and sixth forward ratios to supply fluid to the ratio signal line 144 to act on the regulator valve 136 to reduce the pressure in main line 133 and to act on the cut-off valve 206.

The front unit low and high clutch lines 258 and 259 and the rear unit clutch line 262 are connected to similar regulator valves 266, 267 and 268 respectively. These regulator valves during the initial period of clutch application regulate the pressure at a low value and then gradually increase the pressure to main line pressure. When the clutch pressure rises above the initial low regulated value, this pressure being connected to bore 271 moves valve element 272 against the spring 273 permitting the excess fluid to the exhaust through exhausts 274 and 275 to maintain the pressure at a low value controlled by the spring in the position shown. At the same time the fluid passes through the by-pass passage 276 which at this time is blocked by the one-way check valve 277 so that fluid flows through the orifice by-pass passage 278 to the other end of the valve bore 271 where the fluid acts on the piston abutment 279 for the spring 273 and moves the abutment toward the valve element 272. This increases the spring force acting on the valve and thus the regulated pressure in clutch line 259 to main line pressure. The other regulator valves 267—268 function and operate with the same manner to regulate the pressure front low clutch line 258 and the rear high clutch line 262 respectively.

*Operation*

Transmission is operated to engage a selected ratio by the manual valve 256. As pointed above this valve in the first, third and fifth ratios supplies fluid to the front unit low clutch line 258 and respectively to the low, intermediate and high clutches of the rear unit. In second, fourth and sixth ratios the front high clutch 38 is supplied and the same low, intermediate and high clutches of the rear unit are supplied respectively. Whenever a shift is made requiring one of the rear unit clutches to be filled, such as a second to third ratio change, a flow of fluid to the intermediate clutch through the rear unit supply line 208 actuates the cut-off valve 206 to cut off the supply of fluid to the front unit supply line 232. Thus any clutch in the front unit which is engaged, in this example the front high clutch, will be disengaged and then reengaged when the rear unit clutch being filled is substantially engaged. Then pressure on both sides of the orifice 216 equalizes permitting the cut-off valve 206 return to the normal position and reconnect the line 109 to supply line 207 and the front unit supply line 232 to engage the front unit clutch. This arrangement makes it possible to provide minimum capacity rear unit clutches and to accommodate all the slip in the front unit clutches which have a larger heat capacity and are sufficiently cooled to take this extra load upon each shift. Also the front unit clutches are both controlled to provide smooth engagement by the regulator valves 266 and 267.

Whenever the torque being transmitted by the transmission exceeds a safe value, i.e., 4000 foot pounds, the pressure supplied by the torque meter moves the valve against a spring 193 and gradually restricts or reduces the pressure of the fluid supply from main line 149 to the cut-off line 198 and front unit supply line 232 to cause the front unit clutches 34 or 48 to slip or be disconnected to limit the torque being transmitted. Since the front low clutch 34 requires less packing pressure to transmit 4000 foot pounds of torque, whenever the low clutch is engaged, torque signal line 127 is connected by the manual valve to the ratio torque line 197 to act on an additional area of the torque limiter valve to restrict the pressure supplied to the front unit supply line 232 to the front unit clutches at a lower value or torque signal pressure.

To protect the transmission against overspeed, the governor 241 supplies the fluid via the governor line 244 to the overspeed cut-off valve 231 and moves this valve to disconnect the supply line 207 from line 232 which supplies the front unit clutches 34 and 38 to disengage these clutches. As this valve 231 moves to the cut-off position and land *a* closes exhaust 252 and passage 249 connects the supply to the unbalanced area between the lands *a* and *b* to provide an additional force to hold the valve in the cut-off position. Thus the valve will not move to the open position until the engine speed is reduced by predetermined value below the maximum allowable. This arrangement prevents, during down-hill coasting or other input overspeed conditions, the load driving the engine at excessive or dangerous speeds.

The above described embodiment is illustrative of the invention and it will be appreciated by those skilled in the art that various modifications may be made within the terms of the appended claims.

We claim:

1. In a transmission assembly, a first gear unit providing a plurality of ratio drives, a second gear unit providing a plurality of ratio drives, connected in series with said first unit, control means to selectively engage a ratio drive in said first unit and a ratio drive in said second unit to provide a plurality of combination ratio drives normally transmitting the full power applied to said first unit, means responsive to a predetermined value of torque being transmitted by said units operatively connected to said control means to partially disengage the drive ratio engaged in said first unit to continue to transmit torque and to limit the torque transmitted to a predetermined maximum safe value to prevent damage to the transmission assembly.

2. In a transmission assembly, multiratio transmission drive train means having multiratio gearing and a plurality of groups of fluid actuated ratio friction engaging devices each having a plurality of said devices operative for providing each of a plurality of drive train ratios on the engagement of at least two of said ratio engaging devices one in each group, a source of fluid under pressure, means to control the pressure of the fluid from said source to provide a low and a high fluid pressure, valve means to control the supply of fluid from said source in each ratio position to engage two of said fluid actuated ratio engaging devices to provide each drive ratio, control means effective only during the engaging movement of one of said ratio engaging devices to insure disengagement of another of said ratio engaging devices operative in each drive train ratio, said control means being effective when said one ratio engaging device is engaged to engage said other ratio engaging device, and means to modify the action of said control means to effect disengagement and engagement of said other ratio engaging device when the engaging pressure at said one ratio engaging device is changed between said low pressure and said high pressure of said source.

3. In a transmission, an input member, an intermediate member, an output member, a front unit providing a plurality of ratios and having fluid operated means to engage each ratio connecting said input and intermediate members, a rear unit providing a plurality of forward ratios and reverse and having fluid operated means to engage each ratio connecting said intermediate and output members, a source of fluid under pressure including a front unit supply line and a rear unit supply line, selector valve means to selectively connect said front unit supply line to one of said fluid operated means of said front unit and said rear unit supply line to one of said fluid operated means of said rear unit in various combinations to provide a plurality of drive ratios for said transmission assembly, valve means responsive to the flow of fluid through said rear unit supply line to cut off the flow of fluid through said front unit supply line, torque sensing means connected to said input member to provide a signal pressure proportional to the torque being transmitted by said input member, torque limiting valve means responsive to said torque signal pressure to limit the pressure supplied to said front unit supply line to limit the pressure to said front unit fluid operated means to limit the torque transmitted by the transmission, means controlled by said selector valve connected to said torque limiting valve means to control the pressure supplied to said front unit supply line to vary the pressure to said fluid operating means to control the torque transmitted in each ratio by said front unit to said intermediate shaft to the same torque value, governor means to supply a pressure proportionate to the speed of said input member, and means responsive to said governor pressure to cut off the supply of fluid to said front unit supply line to disengage said front unit.

4. In a transmission, an input member, an intermediate member, an output member, a front unit providing a plurality of ratios and having fluid operated means to engage each ratio connecting said input and intermediate members, a rear unit providing a plurality of forward ratios and having fluid operated means to engage each ratio connecting said intermediate and output members, a source of fluid under pressure including a front unit supply line and a rear unit supply line, selector valve means to selectively connect said front unit supply line to one of said fluid operated means of said front unit and said rear unit supply line to one of said fluid operated means of said rear unit in various combinations to provide a plurality of drive ratios for said transmission assembly, valve means responsive to the flow of fluid through one of said supply lines to cut off the flow of fluid through the other of said supply lines, torque sensing means connected to said input member to provide a signal pressure proportionate to the torque being transmitted by said input member, and torque limiting valve means responsive to said torque signal pressure to limit the pressure supplied to one of said supply lines to limit the pressure to said fluid operated means to limit the torque transmitted by the transmission.

5. In a transmission, an input member, an intermediate member, an output member, a front unit providing a plurality of ratios and having fluid operated means to engage each ratio connecting said input and intermediate members, a rear unit providing a plurality of forward ratios and having fluid operated means to engage each ratio connecting said intermediate and output members, a source of fluid under pressure including a front unit supply line and a rear unit supply line, selector valve means to selectively connect said front unit supply line to one of said fluid operated means of said front unit and said rear unit supply line to one of said fluid operated means of said rear unit in various combinations to provide a plurality of drive ratios for said transmission assembly, valve means responsive to the flow of fluid through said rear unit supply line to cut off the flow of fluid through said front unit supply line, torque sensing means connected to said input member to provide a signal pressure proportional to the torque being transmitted by said input member, and torque limiting valve means responsive to said torque signal pressure to limit the pressure supplied to said front unit supply line to limit the pressure to said front unit fluid operated means to limit the torque transmitted by the transmission.

6. The invention defined by claim 5 and means controlled by said selector valve connected to said torque limiting valve means to control the pressure supplied to said front unit supply line to vary the pressure to said fluid operating means to control the torque transmitted in each ratio by said front unit to said intermediate shaft to the same torque value.

7. The invention defined by claim 5 and means to regulate the pressure of said source at times at a low value and at times at a high value in accordance with the operation of the transmission, and said valve means being responsive to the same proportion of flow when said flow of fluid through said rear unit supply line is at said high pressure and said low pressure.

8. In a transmission, an input member, an output member, a first unit providing a plurality of ratios and having fluid operated means to engage each ratio, a second unit providing a plurality of forward ratios and having fluid operated means to engage each ratio, said first and second units being connected in series between said input and output members, a source of fluid under pressure including a first unit supply line and a second unit supply line, selector valve means to selectively connect said first unit supply line to one or another of said fluid operated means of said first unit and said second unit supply line to one or another of said fluid operated means of said second unit in various combinations to provide a plurality of drive ratios for said transmission assembly, and control valve means nomally permitting flow through the other of said supply lines and responsive to the flow of fluid through one of said supply lines to both the one and the another fluid operated means supplied by said one of said supply lines to cut off the flow of fluid through said other of said supply lines.

9. The invention defined in claim 8 and said control valve means disconnecting said source from said other supply line to disengage a fluid operated means immediately on the initiation of flow in said one supply line and connecting said source to said other supply line to reengage said last mentioned fluid operated means when said flow in said one supply line is reduced to a predetermined value.

10. The invention defined in claim 8 said source having pressure regulating means providing at times a low pressure level and at times a high pressure level in accordance with predetermined conditions of transmission operation, and said control valve means disconnecting said source from said other supply line to disengage a fluid operated means immediately on the initiation of flow in said one supply line and connecting said source to said other supply line to reengage said last mentioned fluid operated means when said flow in said one supply line is reduced to a predetermined value providing an engaging pressure having the same proportion to the pressure of said source at said high and low pressure levels.

11. In a transmission assembly, a multiratio transmission drive train having a plurality of groups of fluid actuated ratio friction engaging devices and each of said groups having a plurality of said devices, arranged so that in each drive train ratio a set of at least two of said ratio engaging devices, including one in each group, is engaged to provide each drive train ratio, a source of fluid under pressure, means to control the pressure of the fluid from said source to provide a low and a high fluid pressure, valve means to control the supply of fluid from said source to engage a set of said fluid actuated ratio engaging devices, one in each group, to provide each drive train ratio, control means effective during the engagement of one of said ratio engaging devices in one group to insure disengagement of another of said ratio engaging devices in another group operative in each drive ratio, said control means being effective when said one ratio engaging device is engaged to engage said other ratio engaging device, and means to modify the action of said control means to effect disengagement and engagement of said other ratio engaging device when the engaging pressure at said one ratio engaging device has the same proportion to said low pressure and said high pressure of said source.

12. In a transmission assembly, a multiratio transmission drive train having a plurality of groups of fluid actuated ratio friction engaging devices with each group having a plurality of said devices each operative on the supply of fluid to engage a drive and arranged so that in each ratio a set of said ratio engaging devices including one in each group, is engaged to provide each drive train ratio, a source of fluid under pressure, valve means connecting said source selectively to sets of said ratio engaging devices to control the supply of fluid from said source to engage a set of said fluid actuated ratio engaging devices to provide each drive train ratio, control means responsive to the flow of fluid from said source to one of each set of ratio engaging devices engaged to provide a drive train ratio to insure disengagement of another of said set of ratio engaging devices engaged to provide a drive train ratio and to permit engagement when flow ceases.

13. In a transmission; gear train means including first gear means having a plurality of first fluid operated friction engaging means selectively operative for selectively establishing each of a plurality of first gear means ratio drives, and second gear means connected in series with said first gear means and having a plurality of second fluid operated friction engaging means selectively operative for selectively establishing each of a plurality of second gear means ratio drives; said gear train means being operable on the engagement of a selected one of said ratio drives in each of said first and second gear means to provide a plurality of gear train ratios; a source of fluid under pressure; shift control means operative in each of a plurality of shift control positions to connect said source to selected pairs of said fluid operated friction engaging means, each pair including one of said first fluid operated friction engaging means and one of said second fluid operated friction engaging means and providing a gear train ratio, and means responsive to a shift change caused by movement of said shift control means from one position to another position disengaging one of said second fluid operated friction engaging means and engaging another of said second fluid operated friction engaging means operative for insuring disengagement of all of said first fluid operated friction engaging means until after said another of said second fluid operated friction engaging means is engaged without load and then permitting engagement of the selected one of said first fluid operated friction engaging means under load.

14. In a transmission; gear train means including first gear means having a plurality of first fluid operated friction engaging means selectively operative for selectively establishing each of a plurality of first gear means ratio drives, and second gear means connected in series with said first gear means and having a plurality of second fluid operated friction engaging means selectively operative for selectively establishing each of a plurality of second gear means ratio drives; said gear train means being operable on the engagement of a selected one of said ratio drives in each of said first and second gear means to provide a plurality of gear train ratios; a source of fluid under pressure; shift control means operative in each of a plurality of shift control positions to first connect said source to a selected one of said second fluid operated friction engaging means for no load engagement and thereafter to connect said source supply to a selected one of said first fluid operated friction engaging means for engagement under load.

15. In a transmission; gear train means including first gear means having a plurality of first fluid operated friction engaging means selectively operative for selectively establishing each of a plurality of first gear means ratio drives, and second gear means connected in series with said first gear means and having a plurality of second fluid operated friction engaging means selectively operative for selectively establishing each of a plurality of second gear means ratio drives; said gear train means being operable on the engagement of selected groups each including a selected one of said ratio drives in each of said first and second gear means to provide a plurality of gear train ratios; a source of fluid under pressure; torque measuring means connected to said gear train for providing a signal varying with the torque transmitted by said gear train means; first regulator valve means controlled by said signal providing a first pressure varying with said torque transmitted by said gear train means; second regulator valve means providing a second pressure; shift control means operative in each of a plurality of shift control positions to first connect said second regulator valve means to supply said second pressure to a selected one of said second fluid operated friction engaging means for no load engagement and thereafter to connect said first regulator valve means to supply said first pressure to a selected one of said first fluid operated friction engaging means for engagement under load; said first fluid operated friction engaging means being operated by said first pressure to transmit only a limited torque value; and said second fluid operated friction engaging means being operated by said second pressure to transmit torque substantially in excess of said limited torque value.

16. In a transmission; gear train means including first gear means having a plurality of first fluid operated friction engaging means selectively operative for selectively establishing each of a plurality of first gear means ratio drives, and second gear means connected in series with said first gear means and having a plurality of second fluid operated friction engaging means selectively operative for selectively establishing each of a plurality of second gear means ratio drives; said gear train means being operable on the engagement of selected groups each including a selected one of said ratio drives in each of said first and second gear means to provide a plurality of gear train ratios; a source of fluid under pressure; torque measuring means connected to said gear train for providing a signal varying with the torque transmitted by said gear train means; first regulator valve means controlled by said signal providing a first pressure varying with said torque transmitted by said gear train means; second regulator valve means providing a second pressure; shift control means operative in each of a plurality of shift control positions to connect said first regulator valve means to supply said first pressure to any selected one of said first fluid operated friction engaging means and to connect said second regualtor valve means to supply said second pressure to any selected one of said second fluid operated friction engaging means; each of said first fluid operated friction engaging means being operated by said first pressure to transmit only a limited torque value; and each of said second fluid operated friction engaging means being operated by said second pressure to transmit torque substantially in excess of said limited torque value.

17. In a transmission; gear train means including first gear means having a plurality of first fluid operated friction engaging means selectively operative for selectively establishing each of a plurality of first gear means ratio drives, and second gear means connected in series with said first gear means and having a plurality of second fluid operated friction engaging means selectively operative for selectively establishing each of a plurality of second gear means ratio drives; said gear train means being operable on the engagement of a selected one of said ratio drives in each of said first and second gear means to provide a plurality of gear train ratios; a source of fluid under pressure; shift control means operative in each of a plurality of shift control positions to connect said source to selected pairs of said fluid operated friction engaging means, each pair including one of said first fluid operated friction engaging means and one of said second fluid operated friction engaging means for providing a plurality of gear train ratios; torque means connected to said gear means providing a signal varying with the torque transmitted; and mean connected to said torque means operative to control the pressure of the fluid delivered to the selected one of said first fluid operated friction means in accordance with the torque transmitted by said gear means for limiting the torque transmitted by said gear means to the same value in each gear ratio.

18. In a transmission; gear means having gearing controllable to provide a plurality of ratios and a plurality of fluid operated friction engaging means selectively operative for controlling said gearing to selectively establishing each of a plurality of ratio drives; a source of fluid under pressure; shift control means operative in each of a plurality of shift control positions to selectively connect said source to said fluid operated friction engaging means for selectively providing each of a plurality of gear train ratios; torque means connected to said gear means providing a signal varying with the torque transmitted; and pressure control means connected to said torque means operative to control the pressure of the fluid delivered to the selected one of said fluid operated friction means in accordance with the torque transmitted by said gear means to control the engaging force of said fluid operated friction engaging means to transmit the same torque in the ratio drives of said gear means.

19. The invention defined in claim 18 and said pressure control means controlling said pressure in response to said torque means and in accordance with the ratio selected to change the pressure in each gear ratio to change the engaging force of the fluid operated friction engaging means to transmit the same torque in each ratio drive.

20. The invention defined in claim 18 and said pressure control means reducing said engaging force on a reduction of the torque transmitted during a change of said ratio drives.

References Cited in the file of this patent
UNITED STATES PATENTS

| | | |
|---|---|---|
| 1,386,925 | Constantinesco | Aug. 9, 1921 |
| 2,054,377 | Havill et al. | Sept. 15, 1936 |
| 2,062,523 | Miller et al. | Dec. 1, 1936 |
| 2,454,565 | Peterson | Nov. 23, 1948 |
| 2,641,144 | Schneider | June 9, 1953 |
| 2,642,971 | Hagenbook | June 23, 1953 |
| 2,646,150 | Hobbs | July 21, 1953 |
| 2,679,170 | Prittie | May 25, 1954 |
| 2,701,974 | Miller | Feb. 15, 1955 |
| 2,715,834 | Chamberlin | Aug. 23, 1955 |
| 2,724,266 | Baker et al. | Nov. 22, 1955 |
| 2,738,689 | Dodge | Mar. 20, 1956 |
| 2,787,920 | Blaha | Apr. 9, 1957 |
| 2,794,350 | Hart | June 4, 1957 |
| 2,862,397 | Saives | Dec. 2, 1958 |
| 2,923,175 | Perkins | Feb. 2, 1960 |
| 2,926,543 | Holdeman et al. | Mar. 1, 1960 |
| 2,932,988 | Flynn et al. | Apr. 19, 1960 |
| 2,978,928 | Tuck et al. | Apr. 11, 1961 |

FOREIGN PATENTS

| | | |
|---|---|---|
| 1,068,790 | France | June 30, 1954 |

UNITED STATES PATENT OFFICE
CERTIFICATE OF CORRECTION

Patent No. 3,101,012                                          August 20, 1963

Howard W. Christenson et al.

It is hereby certified that error appears in the above numbered patent requiring correction and that the said Letters Patent should read as corrected below.

Column 3, line 72, for "of" first occurrence, read -- or --; column 5, line 12, for "valve element 173" read -- valve element 174 --; column 8, line 42, for "line 109" read -- line 198 --; line 57, for "48" read -- 38 --; line 65, for "or" read -- of --.

Signed and sealed this 14th day of April 1964.

(SEAL)
Attest:
ERNEST W. SWIDER                                            EDWARD J. BRENNER Attesting Officer                                              Commissioner of Patents